US007849226B2

(12) United States Patent
Zigmond et al.

(10) Patent No.: US 7,849,226 B2
(45) Date of Patent: Dec. 7, 2010

(54) TELEVISION WITH SET TOP INTERNET TERMINAL WITH USER INTERFACE WHEREIN AUXILIARY CONTENT IS RECEIVED THAT IS ASSOCIATED WITH CURRENT TELEVISION PROGRAMMING

(75) Inventors: Daniel J. Zigmond, Carnation, WA (US); David R. Anderson, Saratoga, CA (US); Christopher M. White, San Francisco, CA (US); Jeffrey D. Yaksick, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 729 days.

(21) Appl. No.: 11/004,088

(22) Filed: Dec. 2, 2004

(65) Prior Publication Data

US 2005/0097622 A1 May 5, 2005

Related U.S. Application Data

(63) Continuation of application No. 09/153,577, filed on Sep. 15, 1998, now abandoned, which is a continuation-in-part of application No. 09/099,118, filed on Jun. 17, 1998, now Pat. No. 6,400,407, which is a continuation-in-part of application No. 09/099,481, filed on Jun. 17, 1998, now Pat. No. 6,215,483.

(51) Int. Cl.
*G06F 13/00* (2006.01)
*G06F 17/00* (2006.01)
*H04N 7/20* (2006.01)
*H04N 7/173* (2006.01)

(52) U.S. Cl. .............................. 710/1; 725/32; 725/35; 725/37; 725/38; 725/51; 725/109; 725/110; 725/111; 725/112; 725/113; 725/135; 701/1; 701/5; 715/500.1

(58) Field of Classification Search ......... 725/109–113, 725/35, 37–61, 32, 135, 218, 224; 209/218, 209/224; 709/219–222; 701/1, 5; 715/500.1; 710/1
See application file for complete search history.

(56) References Cited

U.S. PATENT DOCUMENTS 4,894,789 A 1/1990 Yee (Continued)

FOREIGN PATENT DOCUMENTS

| WO | WO 97/22207 | 6/1997 |
|---|---|---|
| WO | WO 98/17064 | 4/1998 |

OTHER PUBLICATIONS

Papadimitriou, C. et al., "Information Caching For Delivery Of Personalized Video Programs On Home Entertainment Channels," Proceedings of the International Conference on Multimedia Computing and Systems, Boston, MA, May 14-19, 1994, pp. 214-223.*

(Continued)

*Primary Examiner*—Tammara Peyton
(74) *Attorney, Agent, or Firm*—Klarquist Sparkman, LLP

(57) ABSTRACT

A viewer of television programming is alerted to the availability of content related to the programming (e.g. an associated Internet web page) by an icon momentarily displayed on the screen. Using a remote control, the viewer can select the icon. A control panel then appears, superimposed over the television image, and provides additional detail about the related content. By further operating the remote control, the viewer can select the associated content for viewing, or return to watching the television. Various other features and variations are disclosed.

12 Claims, 10 Drawing Sheets

U.S. PATENT DOCUMENTS

| | | | |
|---|---|---|---|
| 5,010,499 A | 4/1991 | Yee | |
| 5,121,476 A | 6/1992 | Yee | |
| 5,648,824 A | 7/1997 | Dunn et al. | |
| 5,710,884 A * | 1/1998 | Dedrick | 709/217 |
| 5,737,552 A | 4/1998 | Lavallee et al. | |
| 5,761,606 A | 6/1998 | Wolzien | |
| 5,771,354 A | 6/1998 | Crawford | |
| 5,774,666 A | 6/1998 | Portuesi | |
| 5,778,181 A | 7/1998 | Hidary et al. | |
| 5,801,747 A | 9/1998 | Bedard | |
| 5,818,441 A | 10/1998 | Throckmorton et al. | |
| 5,818,935 A | 10/1998 | Maa | |
| 5,832,223 A | 11/1998 | Hara et al. | |
| 5,844,620 A | 12/1998 | Coleman et al. | |
| 5,848,352 A | 12/1998 | Dougherty et al. | |
| 5,864,823 A | 1/1999 | Levitan | |
| 5,867,208 A | 2/1999 | McLaren | |
| 5,905,865 A * | 5/1999 | Palmer et al. | 725/112 |
| 5,929,849 A | 7/1999 | Kikinis | |
| 5,929,850 A | 7/1999 | Broadwin et al. | |
| 5,931,908 A | 8/1999 | Gerba et al. | |
| 5,940,073 A | 8/1999 | Klosterman et al. | |
| 5,948,061 A * | 9/1999 | Merriman et al. | 709/219 |
| 5,961,603 A | 10/1999 | Kunkel et al. | |
| 6,002,394 A | 12/1999 | Schein et al. | |
| 6,002,444 A | 12/1999 | Marshall et al. | |
| 6,009,410 A | 12/1999 | LeMole et al. | |
| 6,011,537 A | 1/2000 | Slotznick | |
| 6,018,768 A | 1/2000 | Ullman et al. | |
| 6,023,698 A | 2/2000 | Lavey et al. | |
| 6,026,435 A | 2/2000 | Enomoto et al. | |
| 6,058,430 A | 5/2000 | Kaplan | |
| 6,061,719 A | 5/2000 | Bendinelli et al. | |
| 6,064,376 A | 5/2000 | Berezowski et al. | |
| 6,075,568 A | 6/2000 | Matsuura | |
| 6,081,842 A | 6/2000 | Shachar | |
| 6,108,706 A | 8/2000 | Birdwell et al. | |
| 6,141,678 A | 10/2000 | Britt, Jr. | |
| 6,144,944 A * | 11/2000 | Kurtzman et al. | 705/14 |
| 6,169,541 B1 | 1/2001 | Smith | |
| 6,177,931 B1 * | 1/2001 | Alexander et al. | 725/52 |
| 6,189,030 B1 * | 2/2001 | Kirsch et al. | 709/224 |
| 6,215,483 B1 | 4/2001 | Zigmond | |
| 6,229,532 B1 | 5/2001 | Fuji | |
| 6,240,555 B1 | 5/2001 | Shoff et al. | |
| 6,243,741 B1 | 6/2001 | Utsumi | |
| 6,260,192 B1 | 7/2001 | Rosin et al. | |
| 6,285,407 B1 | 9/2001 | Yasuki et al. | |
| 6,317,780 B1 | 11/2001 | Cohn et al. | |
| 6,335,736 B1 | 1/2002 | Wagner et al. | |
| 6,367,080 B1 | 4/2002 | Enomoto et al. | |
| 6,373,503 B1 | 4/2002 | Perkes | |
| 6,400,407 B1 | 6/2002 | Zigmond et al. | |
| 6,412,111 B1 | 6/2002 | Cato | |
| 6,473,903 B2 | 10/2002 | Balakrishnan et al. | |
| 6,510,557 B1 * | 1/2003 | Thrift | 725/110 |
| 6,512,551 B1 | 1/2003 | Lund | |
| 6,513,069 B1 * | 1/2003 | Abato et al. | 709/238 |
| 6,564,379 B1 | 5/2003 | Knudson et al. | |
| 6,584,153 B1 | 6/2003 | Gordon et al. | |
| 6,604,242 B1 | 8/2003 | Weinstein et al. | |
| 6,615,251 B1 | 9/2003 | Klug et al. | |
| 6,662,007 B2 | 12/2003 | Yuen | |
| 6,754,905 B2 | 6/2004 | Gordon et al. | |
| 6,886,178 B1 | 4/2005 | Mao et al. | |
| 7,243,139 B2 * | 7/2007 | Ullman et al. | 709/219 |
| 7,409,437 B2 * | 8/2008 | Ullman et al. | 709/219 |
| 7,529,856 B2 * | 5/2009 | Medin | 709/249 |
| 2001/0001160 A1 | 5/2001 | Shoff et al. | |
| 2001/0056577 A1 | 12/2001 | Gordon et al. | |
| 2002/0010926 A1 | 1/2002 | Lee | |
| 2003/0005463 A1 | 1/2003 | Macrae et al. | |
| 2004/0103439 A1 | 5/2004 | Macrae et al. | |

OTHER PUBLICATIONS

Jones, "The Microsoft Interactive TV System: An Experience Report", p. 5 (Jul. 1997).

J. Gifford, "Teletext Decoder," *Radio-Electronics*, pp. 45-49, Apr. 1996.

Electronic Industries Association Engineering Department, "EIA Standard Recommended Practice For Line 21 Data Service," pp. 1-120, Sep. 1994.

* cited by examiner

TELEVISION WITH SET TOP INTERNET TERMINAL WITH USER INTERFACE WHEREIN AUXILIARY CONTENT IS RECEIVED THAT IS ASSOCIATED WITH CURRENT TELEVISION PROGRAMMING

RELATED APPLICATION DATA

This application is a continuation of U.S. Application Ser. No. 09/153,577, filed Sep. 15, 1998, entitled "Television/Internet Terminal User Interface," which is a continuation-in-part of applications Ser. No. 09/099,118, filed Jun. 17, 1998, entitled "Communicating Logical Addresses of Resources in a Data Service Channel of a Video Signal," and Ser. No. 09/099,481, filed Jun. 17, 1998, entitled "Combining Real-Time and Batch Mode Logical Address Links," the disclosures of which are incorporated by reference.

FIELD OF THE INVENTION

The present invention relates generally to user interfaces for interactive television which facilitate switching between viewing a television program and viewing content related to that television program.

BACKGROUND OF THE INVENTION

The Internet is a well-known, global network of cooperatively interconnected computer networks. The World Wide Web ("WWW" or "Web") portion of the Internet is a collection of interconnected server computers hosting World Wide Web sites (referred to as "Web sites") on the Internet. A Web site consists of stored electronic documents ("Web pages" or "Web content") written in a hypertext mark-up language ("HTML") format and containing references to numerous dependent documents. Web pages can be accessed by a computer user having a connection to the Internet. There are millions of Web sites on the Internet, providing an enormous spectrum of content, including content relating to popular television shows, specific episodes, and popular television characters, and other content desirably associated with a television program by advertisers, producers, or broadcasters (together, "related content" or "auxiliary data").

A Uniform Resource Locator ("URL") identifies the location of a document on the Internet. For example, URLs beginning with the prefix "http://www" identify Web sites and content within the Web sites. Internet content, especially Web content, is frequently identified by URL during television programs or commercial advertisements.

Typically, individuals access the Internet from personal computers by way of software such as an Internet browser, which can be integrated with the operating system of a computer, or packaged as a separate application program. An Internet browser provides a graphical user interface to the Internet by interpreting and displaying Internet content, and supporting user navigation of the Internet.

With the advent of Internet terminals, such as those pioneered by WebTV Networks, Inc., persons without access to a personal computer are also able to access the Internet. Internet terminals work in conjunction with a standard television ("TV") set to display Internet content. Using a user input device such as a remote control or keyboard, a user can navigate the Internet through an Internet terminal. Existing WebTV Internet terminals allow a user alternately to watch TV or browse the Internet. A user cannot simultaneously watch TV and browse the Internet. Further, no graphical user interface facilitates a user switching between watching TV and browsing the Internet for related content.

Alternative mechanisms for packaging related Internet content with a television program have been offered. These mechanisms include encoding related content into a broadcast television signal, for example the Intercast Industry Group's Intercast technology, and encoding a URL into a broadcast television signal, with Internet content subsequently downloaded from the Internet using the URL, for example systems provided by WebTV and ACTV.

The Intercast user interface allows a user to view simultaneously a television program and Internet content. The television program is displayed in a reduced format window. Related content is displayed in a separate window and browsed off-line through a navigation mechanism in a third window. The windows for displaying and navigating Internet content fill a significant portion of the available screen space. In allowing simultaneous viewing of television and Internet content, the Intercast user interface significantly reduces the television viewing space. Further, a viewer of television may find the display of related content in a separate window to be obtrusive or distracting. The Intercast user interface does not unobtrusively notify a viewer that related Internet content is available for viewing. Moreover, although a viewer desirably is allowed to switch easily between full screen viewing of television and related content, the Intercast user interface does not unobtrusively provide a graphical control panel to enable such seamless switching. In addition, the Intercast user interface does not facilitate a user desirably selecting between displaying related content of interest or displaying no related content at all.

The ACTV user interface synchronously displays a television program and timestamped related content. The television program is displayed in a reduced format window on the display screen, with the related content displayed adjacently. Alternatively, the television program and related content are displayed on separate display screens. In addition, the ACTV user interface includes on a portion of the display screen a control panel with a list of URLs that have been broadcast and received by the ACTV system. The control panel may also display URLs for which content is not synchronously displayed but is nonetheless relevant.

In the ACTV user interface, the control panel and window for displaying Internet content fill a significant portion of the available screen space. Although an alternative design with separate display screens is offered, many viewers do not have two display screens. In addition to significantly reducing the television viewing space for most viewers, the ACTV user interface does not unobtrusively notify a television viewer that related content is available for viewing, or provide an unobtrusive graphical user interface to facilitate seamless switching between full screen viewing of television and related content. Moreover, because the ACTV user interface synchronously displays Internet content, the ACTV user interface does not facilitate a user desirably selecting between displaying related content of interest or displaying no related content at all.

SUMMARY OF THE INVENTION

In accordance with embodiments of the present invention, the above-described and other drawbacks of the prior art are overcome.

A preferred embodiment of the present invention includes a graphical user interface for interactive television viewing of a television program and related content. The graphical user interface enables access to related content without displaying the television program in a reduced format window. The graphical user interface accomplishes this by unobtrusively notifying a television viewer that related content is available for viewing, and upon viewer demand providing an unobtrusive control panel that facilitates switching between television and related content. In this way, a user knowledgeably and desirably distinguishes between related content to be displayed and related content not to be displayed.

In an illustrated embodiment of the present invention, a graphical user interface facilitates a user switching between viewing a television program and viewing related Internet content. While watching a television program, an icon appears on the screen of a display device indicating that a logical address link is available to related content. In one embodiment of the present invention, for example, a WebTV user interface displays a translucent "i" icon in the upper right hand corner of the television screen if a URL for a Web page relating to the viewed television program has been received.

If the user actuates a certain button on a user interface selection device, a panel appears on the screen displaying graphical control objects and a description of the related content. If the user actuates one type of graphical control object, the panel disappears. If the user actuates another type of graphical control object, the logical address link is followed to retrieve the related content, and the related content is displayed. While the related content is being retrieved, the television signal may be displayed in a reduced format and a progress indicator displayed until the related content is displayed.

For example, if the user actuates the "Go" button on a WebTV remote control while the icon is displayed, a translucent panel is displayed. The translucent panel includes a descriptor for the Web page and two control buttons, one for ending the panel display and the other for linking to the Web page. If the linking button is actuated using standard WebTV user interface and control techniques, the Web page and its dependencies are downloaded, a graphical progress indicator appears on the screen and the television signal is displayed in reduced form. After the Web page is downloaded, it is displayed.

In an alternative embodiment of the present invention, the icon signaling the availability of a logical address link is displayed for a fixed period of time on the display screen before disappearing. The graphical user interface may also display an icon only if it has been determined that the icon has not previously been displayed for a particular logical address link to related content. In this way, the icon is not redisplayed for the same logical address link. In addition to signaling the viewer about content available over the Internet, the icon may signal the availability of content stored on a CD-ROM or other accessible mass storage device, or on an intranet server or other network.

The panel can include additional graphical control objects. For example, the panel may include a graphical control object for saving the described logical address link to related content into an archival folder. The archival folder can then be browsed at a later time, and a logical address link within the folder followed. A graphical control object for displaying a list of recently provided logical address links and allowing the user to select and follow a displayed logical address link can likewise be provided. The panel may include a graphical control object for displaying a list of previously retrieved content and browsing the content.

Although retrieved related content is displayed instead of the television program in one embodiment of the present invention, in another embodiment, the television program continues to be displayed along with the retrieved related content.

Additional features and advantages of the invention will be made apparent from the following detailed description of an illustrated embodiment, which proceeds with reference to the accompanying drawings.

DETAILED DESCRIPTION OF AN ILLUSTRATED EMBODIMENT

For expository convenience, the present invention is described with reference to an illustrative embodiment, namely a WebTV Internet terminal. It will be recognized, however, that the invention is not so limited.

System Overview

Figure 1:
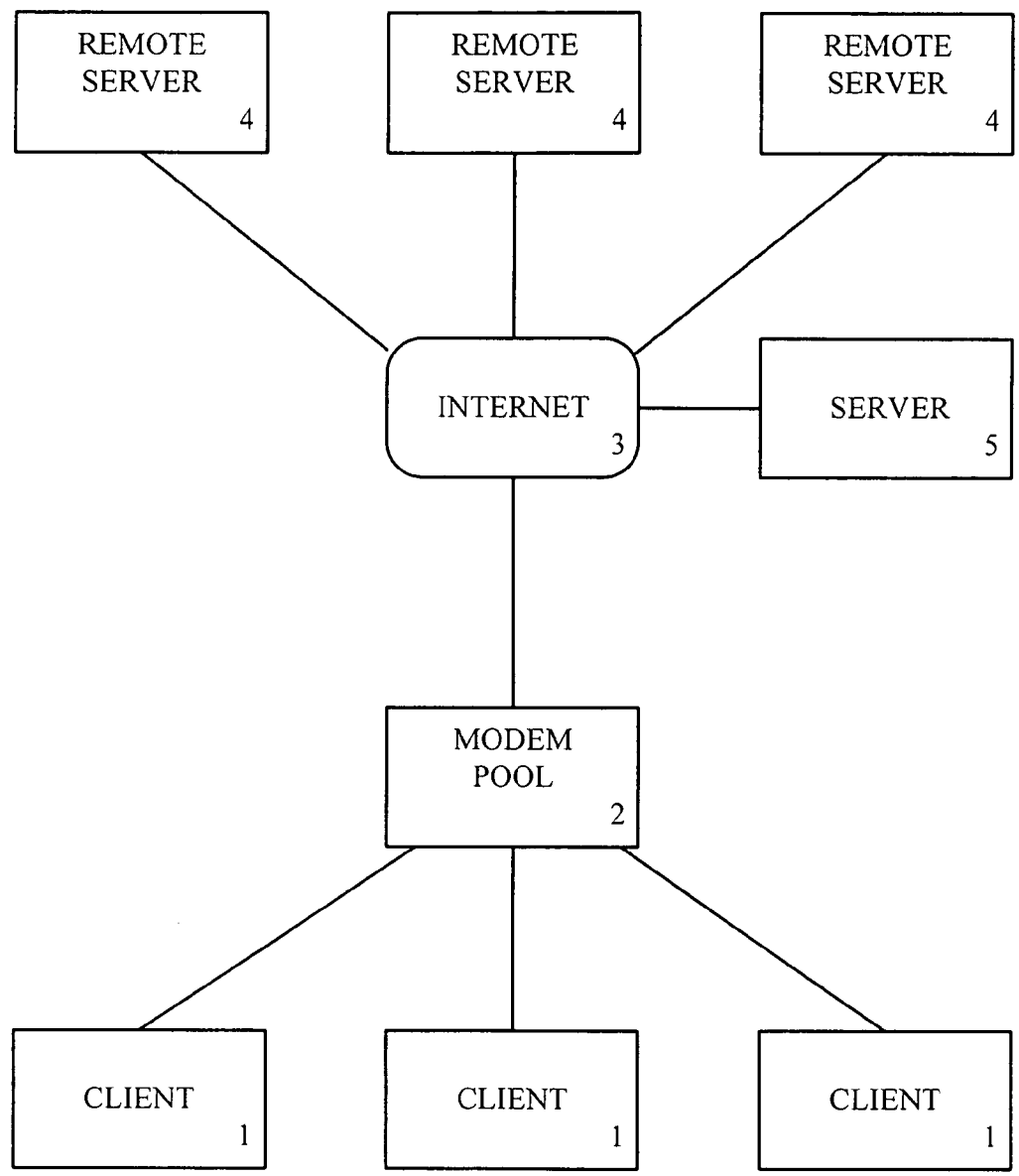
FIG. 1 is a diagram illustrating several client systems connected to a server system.

FIG. 1 illustrates a basic configuration of an Internet system network in which one embodiment of the present invention can be implemented. A number of clients 1 are coupled to a modem pool 2 via direct-dial, bidirectional data connections 29. These connections can be telephone (POTS, i.e., "plain old telephone service"), ISDN (Integrated Services Digital Network), cable, satellite, etc.

The modem pool 2 is coupled through a router, such as that conventionally known in the art, to a number of remote servers 4 via a conventional network infrastructure 3, such as the Internet. The Internet system includes a server 5, which specifically supports the clients 1. The clients 1 each have a connection to the server 5 through the modem pool 2 and the Internet 3.

Embedding of Logical Address Links

Various embodiments of the present invention will be described with reference to logical addresses that are embedded within a broadcast television signal. The logical addresses may provide "links" to Internet, Web, or other local or remote content related or unrelated to a program being broadcast. A form of logical address (also referred to as a resource locator) commonly associated with Web content is a Uniform Resource Locator ("URL"). A URL is a compact string representation of a location used to identify an abstract or physical resource on the Internet. Of course, alternative means of uniquely identifying content may be employed. For example, it is appreciated that keys (e.g., database indices), network addresses (e.g., IP addresses), and other identification mechanisms, alone or in combination, may be employed to uniquely identify a resource. Therefore, while the term URL refers to a specific type of content identifier used in connection with the Web, the terms logical address and/or resource locator are used herein to refer to content/resource identification mechanisms generally.

Links to Internet/Web content provide an easy and powerful way to bring the richness and interactive nature of the Internet to TV. Such links may be used by program producers, program sponsors, networks, local affiliates, and other content providers to link TV viewers to web content specifically designed to complement what the viewers are watching on TV. Various embodiments of the present invention provide and transmit logical addresses that identify content (e.g., Internet content) within a video signal. For example, content providers can transmit URLs to viewers by inserting URL data, in a predetermined syntax, within line 21 of the vertical blanking interval of an analog television signal. Other known data embedding techniques can also be used.

According to one aspect of the present invention, on receipt of a logical address in a TV signal, an icon or some other visual indication is presented to the viewer to notify the viewer of the availability of Internet content. The viewer can then select the visual indication to view the content concurrently with the TV broadcast or save the logical address for later viewing.

Logical addresses embedded in video may refer to content stored on a CD-ROM or other mass storage device, an Intranet server, or other resource. Additionally, certain aspects of the invention described herein are equally applicable to other TV viewing devices, such as personal computers equipped with TV tuners, and the like. Moreover, while various embodiments of the present invention will be described with reference to an NTSC broadcast video signal, other broadcast TV systems are equivalent for the purpose of the present invention, such as Phase Alternate Lines (PAL), Sequential Couleur Avec Memoire (SECAM), and the proposed High Definition Television (HDTV) standard. Finally, it is appreciated that a variety of other transport mechanisms can be employed, including digital satellite, digital TV, and cable TV.

An Exemplary Client System

Figure 2:
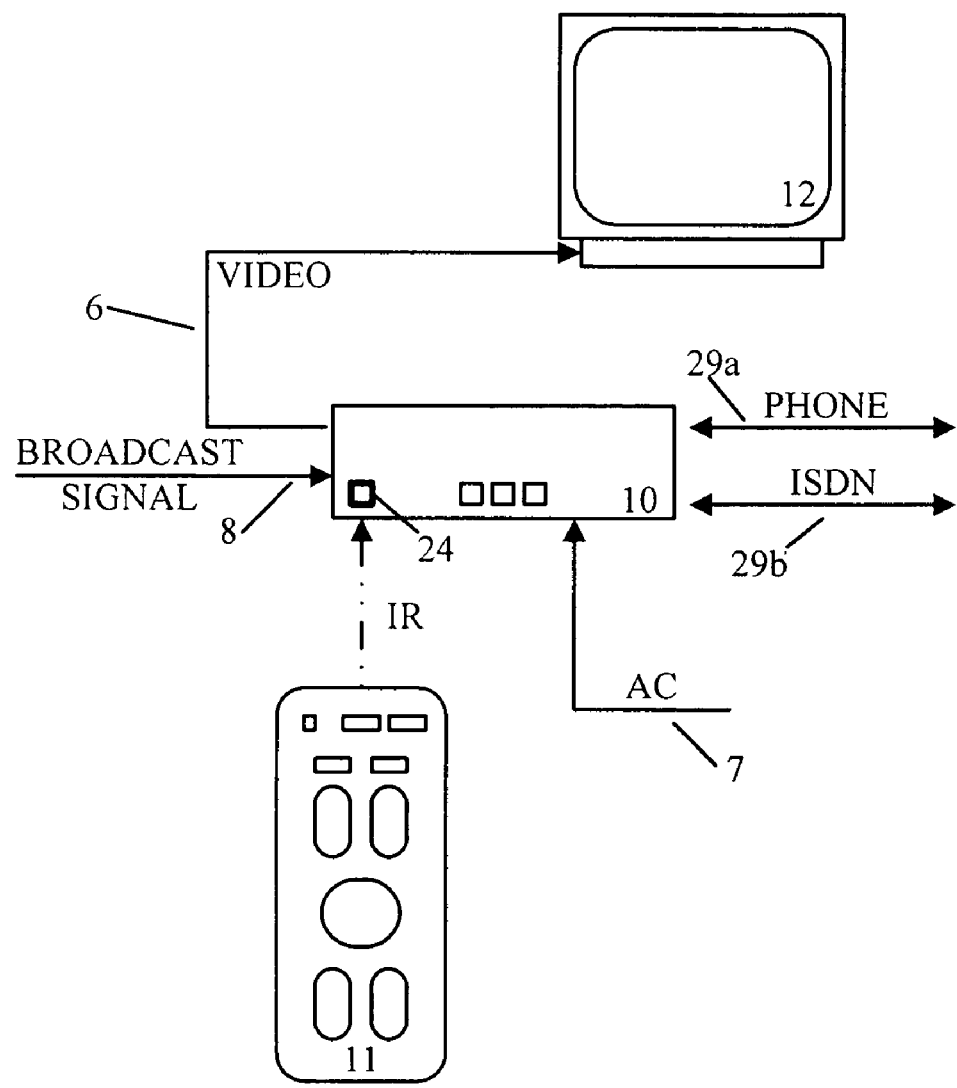
FIG. 2 is a diagram illustrating a client system in which an illustrative embodiment of the present invention is employed.

FIG. 2 illustrates an Internet system client ("client") 1 known in the art. The client 1 includes an electronics unit 10 (hereinafter referred to as "the set-top box 10"), an ordinary television set 12, and a user interface selection device 11. (In an alternative embodiment of the present invention, the set-top box 10 is built into the television set 12 as an integral unit.) In the embodiment depicted, the client 1 uses the television set 12 as a display device for displaying video data and a graphical user interface. The set-top box 10 is coupled to the television set 12 by a video link 6. The video link 6 is an RF (radio frequency), S-video, composite video, or other known form of video link.

The set-top box 10 includes hardware and/or software for receiving and decoding a broadcast video signal 8, and providing video data to the television set via video link 6. The set-top box 10 also includes hardware and/or software for providing the user with a graphical user interface, by which the user can access various Internet services, browse the Web, send e-mail, and otherwise access the Internet.

User interface selection device 11 allows the user to control the client 1 in browsing the Web, sending e-mail, and performing other Internet-related functions. In an illustrated embodiment, user interface selection device 11 is a hand-held remote control. In alternative embodiments, a wireless keyboard, keyboard, or other input device is operated by the user in order to control the client 1. The set-top box 10 receives commands from user interface selection device 11 via an infrared (IR) communication link. (In alternative embodiments, the link between the user interface selection device 11 and the set-top box 10 may be RF or other known mode of transmission.)

Figure 3:
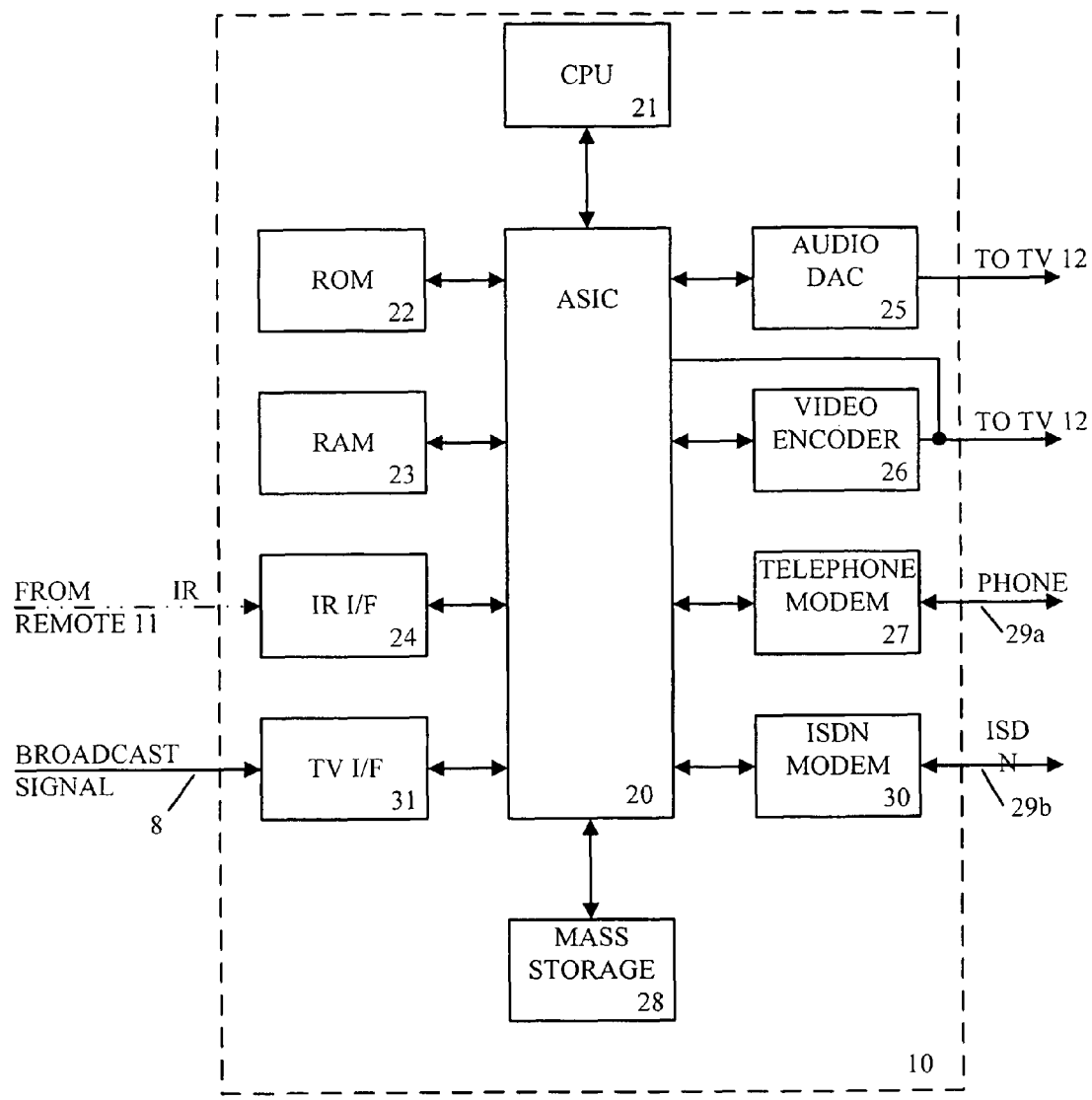
FIG. 3 is a block diagram illustrating exemplary functional units of a set-top box according to one embodiment of the present invention.

FIG. 3 is a block diagram further detailing the set-top box 10. As shown, set-top box 10 includes a CPU 21, ROM memory 22, RAM memory 23, an infrared interface 24, a television interface 31, an audio DAC 25, a video encoder 26, a telephone modem 27, an ISDN modem 30, mass storage 28, and an ASIC 20.

ASIC 20 serves as a bus coupling the other illustrated components, under the control of CPU 21. In some embodiments, ASIC 20 also includes dedicated video processing circuitry that shrinks the size of the displayed television broadcast so as permit display of user interface elements, as more particularly detailed below. (Techniques for shrinking the size of a displayed television signal are known in the art, so are not belabored here.)

The infrared interface 24 receives signals from the remote control 11 and provides corresponding data to the set-top box. The television interface 31 receives broadcast video signals, such as an NTSC video signal, and extracts embedded data. The extracted data, or a portion thereof, can be displayed concurrently with a television program For example, in one embodiment of the present invention, titles corresponding to logical addresses that have been inserted into a text mode data service or a captioning data channel of line 21 of the VBI are extracted by the TV interface 31 and displayed on the TV 12. An exemplary syntax for transporting logical addresses in line 21 of the VBI is described below.

Read-Only Memory 22 provides storage of program code for implementing application software to be executed by the set-top box 10. Memory 22 may be a programmable ROM (PROM) or any form of erasable PROM (EPROM) or Flash memory. Mass storage device 28 is optional, and can be used to input software or data to the client, or to download software or data received over network connection 29 or data embedded in broadcast signal 8. The mass storage device 28 can include any suitable medium for storing machine-executable instructions, such as magnetic disks, optical disks, and the like.

Syntax and Usage of Logical Address Links

Having described an exemplary environment in which embedded logical addresses may be employed, logical address links, their syntax, and usage will now be discussed. Generally, logical address links, such as TV Crossover Links™, enable seamless integration of television programming and the Internet by allowing Internet content to be associated with a television broadcast. (TV Crossover Links™ is a trademark of WebTV Networks, Inc. of Palo Alto, Calif.)

In one embodiment, client 1 allows Web content and television programming to be concurrently displayed as described in co-pending patent application Ser. No. 09/087,354, entitled "Method and Apparatus for Displaying Hypertext Mark-up Language and Video Simultaneously" filed May 29, 1998, assigned to the assignee of the present invention and incorporated herein by reference.

Associations between a television broadcast and Internet content can be performed in real-time or in batch mode. Real-time logical address links are sent to the TV viewer's client system during a television broadcast, e.g. in line 21 of the VBI. In contrast, batch mode logical address links are delivered to the client system in advance of the television broadcast to which they relate. For example, batch mode logical address links can be downloaded from a Web server to the user's client system or delivered on CD-ROM or other computer readable medium. Batch mode logical address links can also be delivered as part of an electronic programming guide (EPG) and may be modified and/or supplemented with real-time logical address links.

While real-time logical address links are valid for a predetermined amount of time after receipt by the client system, batch mode logical address links typically define a time interval. For example, a batch mode logical address link may include a start time and an end time indicating when the link is to be made available to the viewer.

Logical addresses can be transmitted in one of the text service channels of line 21, i.e., First Text Service (T1), Second Text Service (T2), Third Text Service (T3), or Fourth Text Service (T4), or one of the captioning data channels of line 21, i.e., Primary Synchronous Caption Service (CC1), Special Non-synchronous Use Captions (CC2), Secondary Synchronous Caption Service (CC3), or Special Non-synchronous Use Captions (CC4), by using the following encoding format for logical address strings on line 21 of the VBI:

<logical address>[attribute$_1$:value$_1$][attribute$_2$:value$_2$] ... [attribute$_n$:value$_n$][checksum]

The logical address (e.g., a URL) is enclosed in angle brackets. One or more pairs of attributes and values may follow the logical address in square brackets. Finally, a checksum follows the n$^{th}$ attribute/value pair in square brackets. It is appreciated that delimiter characters other than angle brackets and square brackets may be employed. However, it is important to avoid employing delimiters that are included in the URL character set. Additionally, it is preferable that the delimiter be present in both the standard EIA-608 character set and the US-ASCII character set to make logical address links relevant to the widest set of devices.

Exemplary attributes include type and name. The type attribute indicates to what the content relates. For example, the content may be related to the current television program, to the broadcast network, or to one of the commercial sponsors of the current TV program. Table 1 lists exemplary values that may be associated with the type attribute.

TABLE 1

Meaning of Type Attribute Values

| Type Attribute Value | Related to |
| --- | --- |
| PROGRAM | the current program |
| NETWORK | the broadcast network |
| STATION | the local station |
| SPONSOR | a commercial sponsor of the current program |
| OPERATOR | the service (e.g., cable or satellite) operator |

The name attribute provides a concise title for the resource identified by the logical address. It is preferable to associate a title with a logical address since the logical address itself doesn't always make clear what the content of the identified resource is. For example, the URL http://www.nbc.com/tv-central/shows/seinfeld/characters/index.html might identify a web page on NBC's web site that describes frequently appearing characters on the Seinfeld television program. Therefore, for the viewers' convenience, a value such as "Seinfeld Stars" may be associated with the name attribute for this logical address link. Similarly, a web page relating to guest stars, such as the web page located at http://www.nbc.com/tvcentral/shows/seinfeld/characters/char2.html, might be associated with the name "Seinfeld Guest Stars."

Other attributes can be employed as well. For example, a mechanism for purging old links may utilize an attribute that identifies a date or a date/time at which a logical address link expires. In this manner, after the date indicated, logical address links having an expired attribute may be purged from the client's memory.

Importantly, attributes are optional and need not appear in any particular order. For purposes of illustration, exemplary logical address links are listed below (note, however, the checksums have not been calculated):

<http://www.nbc.com/tvcentral/shows/seinfeld/characters/index.html>[name:Seinfeld Stars][A6F1]

<http://www.tvprogram.com>[type:program][name:TV Program][C8C5]

<http://advsponsor.net>[type:sponsor][name:Special Offer][BFA0]

<http://madkad_network.com>[type:network][1128]

<http://www.coolsite.com>[6C1D]

It should be appreciated that logical addresses are not limited to URLs, and that URLs are not limited to the "http:" scheme. Therefore, the following would also be recognized as valid logical address links:

<mailto:info@advsponsor.net>[type:sponsor][5FDB]

<news:alt.tv.program>[type:program][391B]

A checksum is appended to the end of the logical address link in order to detect data corruption that may occur during receipt or transmission of the logical address link. Preferably, a two byte hexadecimal checksum is employed, such as that produced by the standard TCP/IP checksum algorithm described in Request For Comments (RFC) 719, "Internet Protocol", September 1981. The checksum can be computed by pairing adjacent characters in the string (starting with the first delimiter) to form 16-bit integers. If there are an odd number of characters, the final character is paired with a byte of zeroes. The checksum is computed such that the one's complement sum of all of the 16-bit integers plus the checksum equals the 16-bit integer with all 1 bits. That is, the checksum is the one's complement of the one's complement sum of the 16-bit integers. In this manner, fewer errors go undetected than in previously suggested 7-bit checksum schemes, with only a negligible increase in the logical address link's overall length.

Figure 4:
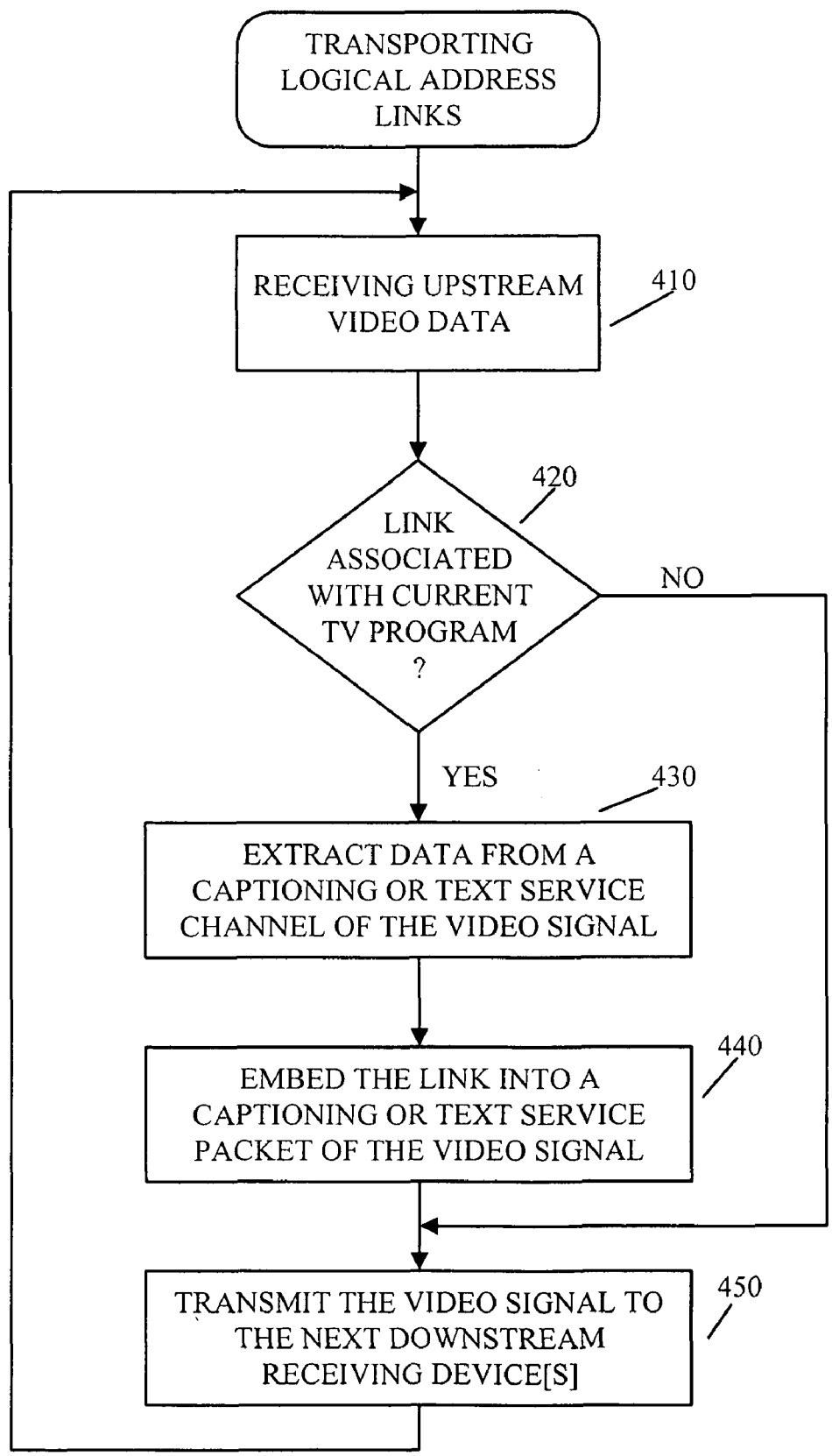
FIG. 4 is a flow diagram illustrating a method of transporting logical address links according to one embodiment of the present invention.

Various embodiments of the present invention employ transportation and reception of logical address links. FIG. 4 is a flow diagram illustrating an exemplary method of transporting logical address links. In the illustrated method, logical address link data to be inserted by a content provider (e.g., a program producer, broadcaster, affiliate, cable or satellite provider), is inserted into upstream video (the source of video onto which the new data will be encoded). At step 410, upstream video data is received from a previous point in the video signal distribution path. At step 420, a determination is made as to whether or not the current distribution point has one or more logical address links that are to be associated with the current TV program being transmitted. If not, processing continues with step 450. Otherwise, processing proceeds with step 430.

The upstream video may or may not contain previously encoded data, such as logical address links, in line 21 of the VBI. Each content provider, therefore, is a potential re-encoding point along the distribution path. At step 430, the existing data is extracted from the captioning data channel or the text service channel of the video signal. Subject to certain bandwidth limitations, the content provider then embeds one or more logical address links into a captioning or text service packet of the video signal (step 440). Finally, at step 450, the video signal is transmitted to the next downstream receiving device(s). This process may be repeated during video signal processing at each point along the video signal distribution path.

WebTV Television Crossover Link™ User Interface

Figure 5:
FIG. 5 is a diagram illustrating a television program displayed on a screen of a display device, according to one embodiment of the present invention.

Referring to FIG. 5, a television program 500 is displayed on the television set 12, as discussed above in conjunction with FIGS. 2 and 3.

Figure 6:
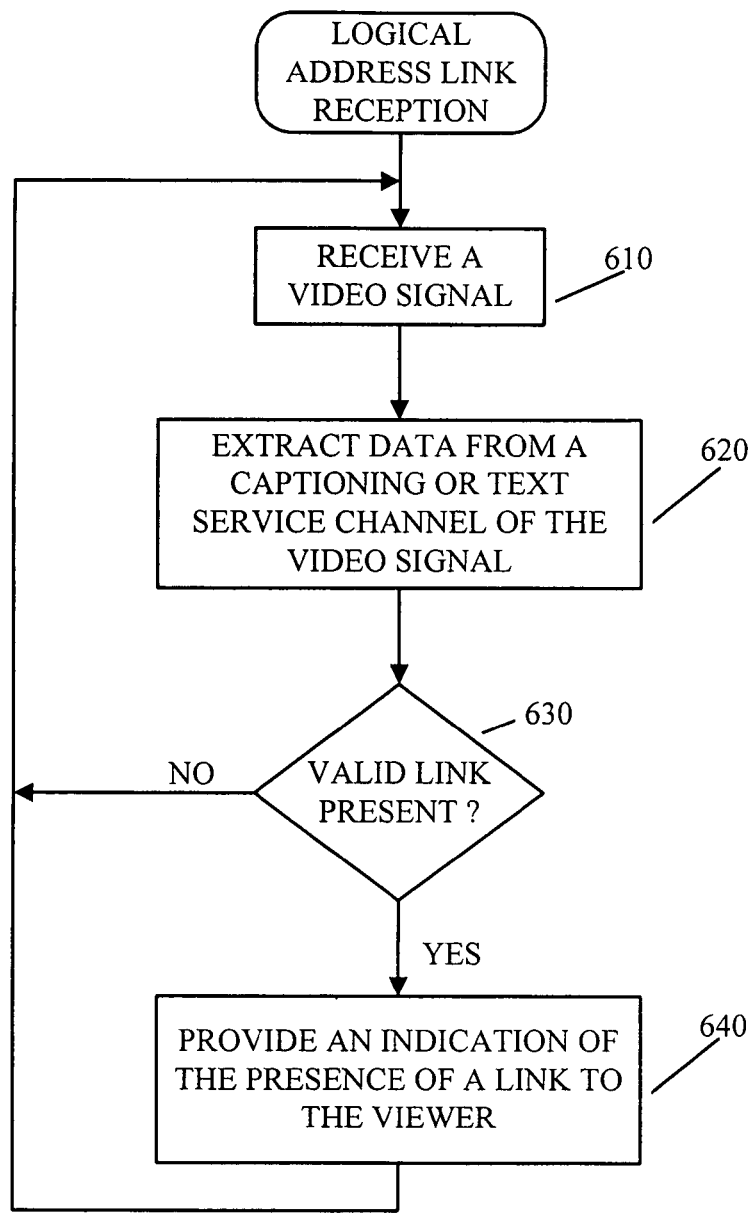
FIG. 6 is a flow diagram illustrating link reception processing according to one embodiment of the present invention.

Logical address link receiving devices, such as a set-top box 10, are able to receive and process logical address links embedded in a broadcast video signal. FIG. 6 is a flow diagram illustrating logical address link reception processing according to one embodiment of the present invention. At step 610, a broadcast video signal, such as an NTSC video signal, is received. Video data extracted from the broadcast video signal is passed through to the display device, e.g., a TV 12 or other display device, such as a computer monitor, for presentation to the viewer.

Encoded data within a captioning or text service channel of the video signal is extracted at step 620. The system determines whether or not a valid logical address link is present (step 630). A valid logical address link is one that is encoded in a predetermined syntax, such as described earlier, and whose logical address and attribute/value pairs are not corrupted (as determined by a comparison of a checksum generated by the receiving device to the checksum accompanying the logical address link). If a valid logical address link is present, then processing continues with step 640. At step 640, as described below, the viewer is alerted that a logical address link is associated with the TV program currently being viewed. According to various embodiments of the present invention, this alert may be a visual indication, an audible signal, or a combination thereof. For example, an icon may temporarily be displayed in one of the corners of the display area. Additionally, a tone may accompany the icon's initial presentation. Other alert mechanisms are possible. In any event, continued reception and processing of the broadcast video signal and embedded logical address links may be achieved by returning to step 610. Returning to step 630, if no valid logical address link is present in the video signal, then processing loops back to step 610

Figure 7:
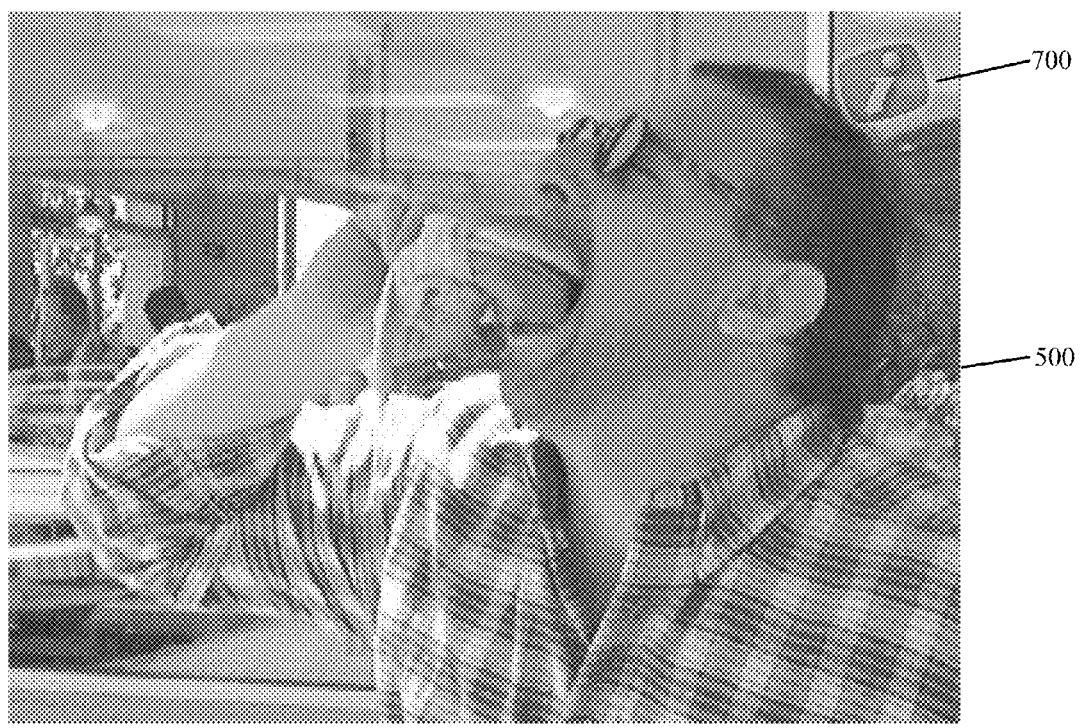
FIG. 7 is a diagram illustrating an icon displayed in addition to the television program, signaling to a viewer the availability of a logical address link to related content, according to one embodiment of the present invention.

Referring to FIGS. 6 and 7, at step 640, an icon 700 is displayed on the television set 12, signaling to the viewer of the television program 500 that a logical address link related to the television program 500 is present. The icon 700 may be translucent (e.g. the video luminance, only, is adjusted to form the icon per known techniques) so as to minimize distraction from the television program 500. Although in FIG. 7 the icon 700 is superimposed on the upper right hand corner of the television program 500, both the appearance and the placement of the icon 700 can be altered without departing from the principles and scope of the present invention.

The display of icon 700 for a particular logical address link ends when the viewer indicates interest in the related content associated with icon 700. Moreover, to prevent an unwanted icon from persisting on the display screen, and to alert the viewer when a new or different logical address link has been received, the display of icon 700 may end after a fixed period of time. In one embodiment, display of the icon 700 lasts at most 15 seconds. In an alternative embodiment, when identical logical address links are repeatedly received by the receiving device 10, the icon 700 is displayed only if it has been determined that the icon 700 was not previously displayed for a particular logical address link. In this way, the icon 700 is not redisplayed for the same logical address link. (The link data may be sent repeatedly during a program to account, e.g., for viewers tuning in after the beginning of the program. Viewers who have been watching since the beginning should not be alerted each time the link data is re-sent.)

In FIG. 7, the icon 700 signals the viewer that a logical address link to related HTML content on the Web is available. An icon might alternatively signal the availability of content stored on a CD-ROM or other accessible mass storage device, or on an intranet server or other network.

Figure 8:
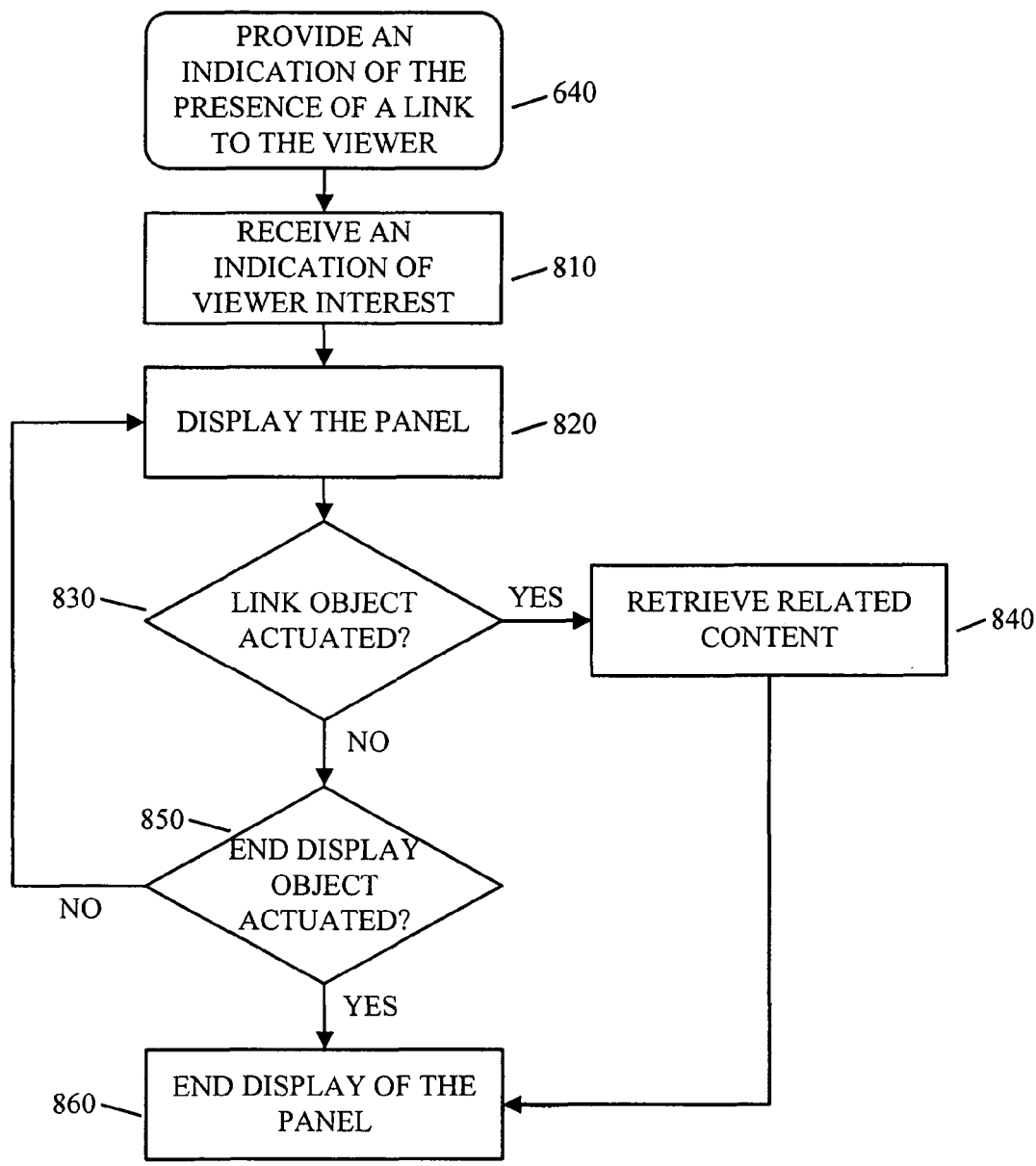
FIG. 8 is a flow diagram illustrating user input processing according to one embodiment of the present invention.

FIG. 8 is a flow diagram showing how the system responds when the viewer responds to the alert. At step 810, a viewer indication of interest in the related content is received. Typically, a viewer indicates such interest by actuating a control on a user interface selection device 11. For example, on a WebTV remote control, a viewer presses the "Go" button to indicate interest. As is known in the art, a variety of other mechanisms for indicating interest are available for other user interface selection devices.

Figure 9:
FIG. 9 is a diagram illustrating a panel displayed in addition to the television program, in response to viewer indication of interest in the related content, according to one embodiment of the present invention.
Figure 10:
FIG. 10 is a diagram illustrating a television program displayed in a reduced format along with a progress indicator, in response to viewer indication of desire to retrieve the related content, according to one embodiment of the present invention.

In response to the viewer indication of interest 810, a translucent panel 900 (FIG. 9) is displayed 820 over the television program 500. The panel 900 includes a descriptor 910 of the related content (e.g. "Seinfeld's Stars," or "Seinfeld Guest Stars," as referenced above), and one or more graphical control objects 920. The descriptor 910 can be transmitted along with the logical address link (e.g. as a name attribute of a transmitted URL), or can be obtained from another source. (The appearance of panel 900, it position, and contents, can be varied without departing from the scope of the present invention. For example, descriptor 910 can include, or consist entirely or, the raw URL, rather than an associated textual description.)

Panel 900 gives the viewer additional information beyond the mere fact of an alert (provided by the icon 700). If, after receiving this additional information, the user wishes to pursue the associated content, the remote control device 11 can be operated to select and invoke (using known user interface selection/invocation techniques) the "Go to Web Page" graphical control object 920 on the panel 900. If this action is taken, the FIG. 8 flow chart proceeds from step 830 to 840, and transfer of the related content is initiated (e.g. downloading the web page from the Internet is commenced).

In the illustrated embodiment, if the "Go to Web Page" option is selected, the system removes the panel 900 from the screen, shrinks the displayed television image, and introduces a bar-graph status indicator at the bottom margin of the screen to show process in downloading the associated content. This indicator can include a descriptor of the logical address link or related content being retrieved. (In other embodiments, the status indicator can be displayed in translucent form over the full-screen television image, or can be omitted entirely.)

When the associated content is fully downloaded and buffered in RAM memory 23, the television image is replaced by display of the associated (e.g. web) content. (In other embodiments, the associated content does not supplant the television image on the screen, but is displayed, picture-in-a-picture format, within the television image. In still other embodiments, it is the television program that is displayed in a window within a display of the associated content.)

If, after reviewing the additional link information provided by panel 900, the viewer decides not to further pursue the associated content, the "Watch TV" graphical control object 920 can be selected and invoked, thereby returning the screen to the television-only display of FIG. 5.

Control panel 900 can include additional graphical control objects 920 beyond those shown. For example, a graphical control object can be provided for selectably saving the received logical address link into an archival folder. The archival folder can be browsed by the viewer at a later time, and desired logical address links within the archival folder can be followed. (In the WebTV user interface, selection of such a graphical control object saves the then-alerted URL into a "Favorites" folder.)

In addition to selectably adding links to a "Favorites" folder, certain embodiments of the present invention automatically log all logical address links received by the system into a master list. A graphical control object 920 can be operated to display this list, and the viewer can select and follow a link for display. (In the WebTV user interface, a graphical control button 920 labeled "Recent" permits the viewer to peruse and follow URLs logged in the master list.) By this arrangement, a viewer who does not wish to interrupt present viewing of the television program, but desires later to pursue a link, can do so.

The system can similarly list (and cache, if desired) previously-retrieved content, permitting the viewer to browse and quickly retrieve content presented earlier for display. Again, a graphical control object 920 on control panel 900 can call-up such a list.

Returning to FIG. 8, after a linking control object is actuated 830, retrieval operations for the related content addressed by the received logical address link are initiated 840, and the display of panel 900 ends 860. While the steps of FIG. 8 illustrate one embodiment of the method of the present invention, the ordering of several steps in FIG. 8 can be changed without departing from the principles and scope of the present invention.

To provide a comprehensive disclosure without unduly lengthening this specification, applicants incorporate by reference the following patents and patent applications:

U.S. Pat. No. 5,778,181 to Hidary et al., entitled "Enhanced Video Programming System and Method;"

U.S. Pat. No. 5,745,909 to Perlman et al, entitled "Method and Apparatus for Reducing Flicker When Displaying HTML Images on a Television Monitor;"

U.S. patent application Ser. No. 08/755,238, filed Nov. 22, 1996 (and now published as WO 98/23059);

U.S. patent application Ser. No. 08/755,233, filed Nov. 22, 1996 (and now published as EP 844,788);

U.S. patent application Ser. No. 08/754,164, filed Nov. 22, 1996 (and now published as EP 844,768);

U.S. patent application Ser. No. 08/755,237, filed Nov. 22, 1996 (and now published as EP 844,572);

U.S. patent application Ser. No. 08/677,914, filed Jul. 9, 1996 (and now published as WO 98/04088);

U.S. patent application Ser. No. 08/677,915, filed Jul. 9, 1996 (and now published as WO 98/01825);

U.S. patent application Ser. No. 08/660,087, filed Jun. 3, 1996 (and now published as WO EP 812,096); and U.S. patent application Ser. No. 08/660,088, filed Jun. 3, 1996 (and now published as EP 811,940).

Having described and illustrated the principles of our invention with reference to a preferred embodiment, in will be recognized that embodiments can be varied in arrangement and detail without departing from such principles.

For example, while the preferred embodiment employs a software-programmed general purpose CPU, in conjunction with an ASIC that performs video processing (e.g. shrinking) functions, in other embodiments such systems can be realized entirely by dedicated hardware.

Similarly, while the invention has been described with reference to an Internet terminal system, such as the WebTV® Internet terminal, it is equally applicable in other contexts, e.g. in accessing other stored information in other viewing systems.

While the foregoing disclosure has focused on systems in which the link data is displayed when it is received, in other embodiments this need not be the case. For example, link information can be stored in the set-top box, and the viewer can be alerted thereto (e.g. by icon 700) when certain conditions exist. For example, a link to an NBC program guide can be alerted to the user at the top- and bottom- of every hour, whenever the viewer is tuned to the local NBC affiliate. (Such link data can be transmitted to the set-top box in background fashion, using otherwise-idle bandwidth in the VBI or other auxiliary video channel.)

Although the foregoing embodiments employ the same icon 700 for all alerts, in other embodiments different icons can be used. For example, different icons can be used to distinguish between advertising-related and programming-related content. The alert can also include data about the link, such as the name of the link. While such an arrangement is more obtrusive, some viewers may prefer the provision of added detail without having to invoke the control panel 900.

In view of the wide variety of possible embodiments to which the principles of our invention can be applied, it should be recognized that the detailed embodiments are illustrative only and should not be taken as limiting the scope of our invention. Rather, we claim as our invention all such variations as come within the scope and spirit of the following claims, and equivalents thereto.

We claim:

1. A method of operating a screen used to display both television programming and auxiliary content using a client device, the client device comprising a processing unit and memory, the method comprising:

causing display of television programming;

receiving, by the client device, link data conveyed in a signal with the television programming, the link data associated with first auxiliary content, wherein the link data is received during the display of the television programming, to which the first auxiliary content is related;

logging, by the client device, the received link data, including a number of times the link data has been received, wherein calculating the number of times the link data has been received comprises comparing the received link data against one or more previously received, and logged, link data; deciding, by the client device, whether or not to cause display of an alert indication with the displayed television programming, the alert indication indicating the availability of the first auxiliary content, wherein the decision is based at least in part upon the number of times the link data representing the availability of the first auxiliary content has been received by the client device: wherein the alert indication is an icon selected from a plurality of different icons each related to a different kind of auxiliary content; and if the decision indicates the alert indication is to be displayed, causing display of the alert indication and, otherwise, skipping the causing display of the alert indication; wherein the link data associated with the first auxiliary content is received by the client device during the displayed television programming at M times, the alert indication is displayed N times, and N is less than M; and wherein, when the decision indicates the alert indication is to be displayed, the method further comprises:

displaying the alert indication with the displayed television programming; receiving a selection of the displayed alert indication from a viewer; responsive to receiving the selection of the displayed alert indication, displaying a graphical control panel; that presents to the viewer a plurality of options selectable by the viewer, an option including a selection by the viewer to indicate desire to return to the displaying televised programming and ending the displaying the graphical control panel; and an option further including a selection by the viewer to receiving, from the viewer, a selection to view the first auxiliary content;

and responsive to receiving the selection to view the first auxiliary content; ending the displaying the graphical control panel; and displaying the first auxiliary content; and further responsive to a request from the viewer, displaying at least a portion of the previously logged link data to the viewer; receiving a selection, from the viewer, from the displayed previously logged link data;

and responsive to receiving the selection from the displayed previously logged link data, displaying, to the viewer, auxiliary content associated with the selection from the previously displayed logged link data.

2. The method of claim 1 wherein M is greater than one and N equals one.

3. The method of claim 1 wherein the client device causes display of the alert indication if the link data associated with the first auxiliary content is received one time.

4. The method of claim 1 wherein the client device causes display of the alert indication the first time the link data associated with the first auxiliary content is received.

5. The method of claim 4 wherein the client device skips the causing display of the alert indication in response to subsequently receiving the link data associated with the first auxiliary content.

6. The method of claim 1 further comprising, with the client device, causing removal of the alert indication when the viewer indicates interest in the first auxiliary content.

7. The method of claim 1 wherein the alert indication is displayed for a predetermined period of time and then removed from the screen.

8. The method of claim 1 wherein the link data comprises a logical address link and the first auxiliary content is located on the Internet.

9. The method of claim 1 wherein the link data comprises a URL and the first auxiliary content comprises a Web page.

10. The method of claim 1 further comprising, with the client device, causing removal of the alert indication in response to receiving second link data conveyed in the signal with the television programming, the second link data associated with second auxiliary content.

11. The method of claim 1 wherein the client device is a set-top box.

12. A client device comprising:

a television interface for receiving a signal for television programming and processing the signal to extract link data embedded within the signal, the link data associated with first auxiliary content;

a user input device interface for receiving user input signals sent from a user with a user input device;

memory for storing computer-executable instructions for controlling display of the television programming and alert indications; and a processing unit for executing the computer-executable instructions to:

log the received link data, including a number of times the link data has been received, wherein calculating the number of times the link data has been received comprises comparing the received link data against one or more previously received, and logged, link data;

cause display of the television programming;

decide whether or not to cause display of an alert indication with the displayed television programming, the alert indication indicating the availability of the first auxiliary content, wherein the decision is based at least in part upon the number of times the link data representing the availability of the first auxiliary content has been received by the client device, wherein the alert indication is an icon selected from a plurality of different icons each related to a different kind of auxiliary content, and if the decision indicates the alert indication is to be displayed, cause display of the alert indication and, otherwise, skip the causing display of the alert indication, wherein the link data associated with the first auxiliary content is received by the client device during the displayed television programming at M times, the alert indication is displayed N times, and N is less than M;

wherein, when the decision indicates the alert indication is to be displayed:

cause display of the alert indication with the displayed television programming:

receive a selection of the displayed alert indication from a viewer;

responsive to receiving the selection of the displayed alert indication, cause display of a graphical control panel, wherein the graphical control panel includes a first graphical control for returning to the displayed television programming and ending the displaying the graphical control panel, and a second graphical control for viewing the first auxiliary content;

receive, from the viewer, a selection to view the first auxiliary content, wherein the selection to view the first auxiliary content is received from the viewer via the second graphical control; and responsive to receiving the selection to view the first auxiliary content:
  ending the displaying the graphical control panel; and
  causing display of the first auxiliary content; and the processing unit further adapted for executing the computer-executable instructions to:

responsive to a request from the viewer, display at least a portion of the previously logged link data to the viewer;

receive a selection, from the viewer, from the displayed previously logged link data; and responsive to receiving the selection from the displayed previously logged link data, display, to the viewer, auxiliary content associated with the selection from the displayed previously logged link data.

* * * * *